United States Patent [19]

Ramaker

[11] Patent Number: 5,610,514
[45] Date of Patent: Mar. 11, 1997

[54] INDUCTIVE SYSTEM FOR MEASURING THE LENGTH OF A SHOCK ABSORBER

[75] Inventor: Antonius E. T. J. Ramaker, Den Haag, Netherlands

[73] Assignee: V.O.F. Hedon Electronic Developments, Delft, Netherlands

[21] Appl. No.: 505,249

[22] PCT Filed: Feb. 17, 1994

[86] PCT No.: PCT/NL94/00040

§ 371 Date: Aug. 16, 1995

§ 102(e) Date: Aug. 16, 1995

[87] PCT Pub. No.: WO94/19206

PCT Pub. Date: Sep. 1, 1994

[30] Foreign Application Priority Data

Feb. 17, 1993 [NL] Netherlands ............................ 9300301

[51] Int. Cl.$^6$ .............................. G01B 7/14; G01N 27/72
[52] U.S. Cl. ...................... 324/207.16; 324/236
[58] Field of Search ...................... 324/207.13, 207.16, 324/207.24, 207.17, 207.25, 207.15, 207.26, 234, 236; 364/556, 560, 562

[56] References Cited

U.S. PATENT DOCUMENTS

| 4,502,006 | 2/1985 | Goodwin et al. | 324/207.16 |
| 4,674,768 | 6/1987 | Morra | 73/118 |
| 4,898,027 | 2/1990 | Morra | 73/118.1 |
| 5,210,490 | 5/1993 | Munch et al. | 324/207.17 |

FOREIGN PATENT DOCUMENTS

| 0466604 | 1/1992 | European Pat. Off. | B60G 17/015 |
| 2573200 | 5/1986 | France | G01B 7/00 |
| 2664045 | 1/1992 | France | G01D 5/20 |
| 2031157 | 4/1990 | United Kingdom | G01B 7/14 |

Primary Examiner—Louis M. Arana
Assistant Examiner—Roger Phillips
Attorney, Agent, or Firm—Michael D. Bednarek; Kilpatrick & Cody

[57] ABSTRACT

The invention relates to an electric circuit for measuring the length of a shock absorber unit of a vehicle, comprising: a coil with windings which are fitted around the shock absorber unit, of which a casing of electrically conducting material connected to a part of the wheel suspension of the vehicle is axially movable relative to the coil when there is a change of length of the shock absorber unit as a result of a change in the force absorbed by the wheel suspension; an oscillator connected to the coil, for exciting the coil with an excitation signal of a predetermined frequency; and processing means which are connected to the coil and are designed for determining the value of a relation between the voltage across the coil and the current through the coil, which value is a measure of the length of the shock absorber unit. In this connection, the length of a shock absorber unit should be understood as the distance between two fixing points thereof in the wheel suspension, while the wheel suspension of the vehicle should be understood as the damped spring construction which couples a wheel in a supporting manner to the body. In this case, the casing of the shock absorber unit can be connected to the body and the coil to the wheel, or the casing can be connected to the wheel and the coil to the body. The term vehicle should be understood not only as a road vehicle such as a lorry or private car, but also as a rail vehicle or an aircraft on the ground.

12 Claims, 3 Drawing Sheets

INDUCTIVE SYSTEM FOR MEASURING THE LENGTH OF A SHOCK ABSORBER

FIELD OF THE INVENTION

The invention relates to an electric circuit for measuring the length of a shock absorber unit of a vehicle, comprising: a coil with windings which are fitted around the shock absorber unit, of which a casing of electrically conducting material connected to a part of the wheel suspension of the vehicle is axially movable relative to the coil when there is a change of length of the shock absorber unit as a result of a change in the force absorbed by the wheel suspension; an oscillator connected to the coil, for exciting the coil with an excitation signal of a predetermined frequency; and processing means which are connected to the coil and are designed for determining the value of a relation between the voltage across the coil and the current through the coil, which value is a measure of the length of the shock absorber unit. In this connection, the length of a shock absorber unit should be understood as the distance between two fixing points thereof in the wheel suspension, while the wheel suspension of the vehicle should be understood as the damped spring construction which couples a wheel in a supporting manner to the body. In this case, the casing of the shock absorber unit can be connected to the body and the coil to the wheel, or the casing can be connected to the wheel and the coil to the body. The term vehicle below should be understood not only as a road vehicle such as a lorry or private car, but also as a rail vehicle or an aircraft on the ground.

BACKGROUND

Shock absorber units which are provided with means for an inductive length measurement thereof are generally known, in particular from U.S. Pat. No. 4,502,006, which discloses how a cylindrical electric coil is disposed coaxially around a shock absorber housing, which housing is axially movable in the coil when there is a change of length of the shock absorber unit. When there is a change in the position of the housing relative to the coil, the electrical properties of the coil change. The phase difference between the alternating current through and the alternating voltage over an excited coil is a measure of the length of the shock absorber unit at the frequency used.

A drawback of the conventional measuring circuits is the sensitivity of the measurement to the temperature of the coil, since the electrical resistance of the coil is dependent on temperature. It is therefore necessary to take an additional measure for temperature compensation, which measure according to EP-A-0 466 604 consists of incorporating a reference resistor in the length measuring circuit. However, this gives only local information on the temperature, which information is therefore not a reliable reflection of the current temperature at the position of a measuring coil.

The accuracy of the length measurement is also adversely affected by the temperature dependence of the electric and magnetic properties of the casing of the shock absorber unit movable inside the coil.

The object of a measurement of the length of a shock absorber unit is generally to gain an idea of the load situation (or, of course, the relative position of components) of the wheel suspension of which the shock absorber unit forms part, or to put it in more general terms: the length of the shock absorber unit is a measure of the force absorbed by the corresponding wheel suspension.

A disadvantage of the shock absorber unit length measuring circuit according to the prior art is the limited band width as a result of the measuring principle used. A narrow-band measurement of the length of the shock absorber unit rules out certain important applications of such a measurement, in particular use of the measurement of the wheel suspension load condition by means of the shock absorber unit length measurement for controlling functions improving ride or riding safety, for example quick-acting active spring systems, anti-lock braking systems etc. Such applications require measurement of the speed or the acceleration of a length change of a shock absorber unit, and therefore require a great band width.

SUMMARY

The object of the invention is to eliminate the abovementioned disadvantages and to provide a shock absorber unit length measuring circuit which is without additional measures insensitive to temperature, and which has a great band width and is not susceptible to faults, which clears the way for all kinds of new potential uses of the shock absorber unit length measuring circuit in systems to be described below.

To this end, the shock absorber unit length measuring circuit of the abovementioned type according to the invention is characterized in that the oscillator is designed for generating an excitation signal with a frequency which is at least so high that the resistive properties of the coil and of the casing of the shock absorber unit are negligible relative to the inductive properties thereof, the relative magnetic permeability of the electrically conducting material of the casing being approximately equal to one; and in that the processing means are designed for determining the immittance of the coil from a direct measurement of the voltage across and the current through the coil.

It has emerged from experiments that at high frequencies the immittance, i.e. the impedance or the admittance, of the coil changes according to the displacement of the casing of the shock absorber unit relative to the coil, so that in these circumstances the immittance of the coil is a particularly suitable measure of the length of the shock absorber unit. Exciting the coil with a high-frequency voltage or current coming from the oscillator means that only the inductive properties of the coil, which can be regarded as the primary winding of a transformer short-circuited at the secondary side, play a role of importance. At the selected high frequency, which can be determined in a simple way for each specific shock absorber unit configuration, and advantageously will be in the range of 100 kHz–20 MHz, preferably higher than 500 kHz, the resistive properties of the coil and the casing of the shock absorber unit are negligible by comparison with the inductive properties. The influence of temperature on the shock absorber length measurement is thus eliminated, since temperature changes influence only the resistive properties of said elements. Moreover, at the high frequency any magnetic properties of the casing of the shock absorber unit and the influences of the temperature thereon are not important, since for high frequencies the relative magnetic permeability of the electrically conducting materials used is equal to one. It should be pointed out here that for high frequencies the phase difference between the voltage across the coil and the current through the coil is virtually constant and approximately equal to $\pi/2$ when length differences of the shock absorber unit occur, so that no information on the length of the shock absorber unit can be deduced from a measurement of said phase difference. It should also be pointed out that the sensitivity of the immittance measurement to deviations of the centring of the coil relative to the casing of the shock absorber unit is extremely low, mainly due to the generated axial field.

The frequency of the excitation signal is in particular selected in such a way that it is lower than the resonance frequency of the measuring circuit.

With the circuit according to the invention, a reliable shock absorber unit length measurement is possible at such a low measuring current that measuring is still possible without any problem even in explosion hazard conditions.

In order to prevent the occurrence of resonance phenomena at high frequencies, the impedance of the coil must be small relative to the parasitic capacity of the measuring circuit, and in particular relative to the parasitic capacity of the coil. If this is not the case, the capacity becomes dominant at the high frequencies used. The envisaged small coil/parasitic capacity impedance ratio is achieved advantageously by winding the windings of the coil with space between them.

The use of a high oscillator frequency makes it possible to carry out filtering on the signal delivered by the processing means, in order to remove from it undesired interference components caused by, for example, the effect of adjacent electromechanical components, the engine ignition of the vehicle of which the shock absorber unit forms part, etc. Such filtering is preferably carried out by means of a band-pass filter which allows through only the frequencies within a narrow band around the excitation signal frequency. Since the shock absorber unit moves at a maximum frequency of approx. 100 Hz, a pass band of the same order of magnitude is sufficient for measuring the length of the shock absorber unit. For measuring the speed of length change of the shock absorber unit, one can then use, for example, a pass band of approx. 1 kHz, and for measuring the acceleration of length change a pass band of approx. 10 kHz can be used.

At a high oscillator frequency the band width of the measuring circuit is so great that it is possible to determine not only the actual length of the shock absorber unit, but also the actual speed of the casing relative to the coil. This last aspect offers many new potential uses for inductive shock absorber unit length measuring circuits in moving vehicles, for example, in rapid load checking systems, quick-acting active systems, and brake power improvement systems, because it is now possible by means of a shock absorber unit length measuring to determine the speed and acceleration of length change of the shock absorber unit, the force $F_w$ currently absorbed by a wheel suspension, and the speed of change of the force absorbed, as will be explained below.

The force which a shock absorber unit delivers during the operation thereof depends on the speed at which a length change of the shock absorber unit occurs. Moreover, this force depends on whether an increase or a reduction in the length of the shock absorber unit occurs. In general, it can thus be said that the force $F_d$ generated by a shock absorber unit is a function $f_1$ of the speed $v_d$ of length change of the shock absorber unit:

$$F_d = f_1(v_d)$$

The force generated by a shock absorber unit can also be a function $f_2$ of the length $(l_d)$ of the shock absorber unit. The total force generated by a shock absorber unit then follows from:

$$F_d = f_1(v_d) + f_2(l_d) \qquad (1)$$

It can be seen from formula (1) that the force generated by a shock absorber unit can be determined on the basis of a measurement of the speed ($v_d$) and the direction thereof, and of the length ($l_d$) of said shock absorber unit.

The force $F_v$ delivered by a spring element of the wheel suspension is a function $f_3$ of the length $l_v$ of the spring element:

$$F_v = f_3(l_v) \qquad (2)$$

If only the forces absorbed by the wheel suspension at right angles to the ground are important, the angle between the longitudinal axis of the shock absorber unit and the vertical will generally be a function $f_4$ of the shock absorber unit length $l_d$, while the angle between the line of action of the spring element and the vertical will in general be a function $f_5$ of the spring length $l_v$. The force $F_w$ absorbed by a wheel suspension then is:

$$F_w = F_d \cos(f_4(l_d)) + F_v \cos(f_5(l_v)) \qquad (3)$$

If the shock absorber unit and the spring element do not act on the wheel suspension at the same place, $l_v$ can be deduced from $l_d$ according to the formula:

$$l_v = f_6(l_d) \qquad (4)$$

in which $f_6$ is a function which can be determined beforehand from the structure of the wheel suspension.

Not all shock absorber unit length measurements produce a meaningful measurement result, in particular if a fortuitous, great length change, caused by an unevenness of the ground over which the vehicle is travelling, is measured. Provision is therefore made for validation means which are connected to the processing means and are designed for comparing the measured value determined by the processing means with threshold values, in which case the validation means suppress or allow through the measured value depending on the result of the comparison.

On the basis of the above, a system can be designed which is operational during the travelling of a vehicle for measurement of the load of a vehicle, which is provided with shock absorber unit length measuring circuits according to the invention, and further comprises: first conversion means which are designed for converting a series of measured immittances of the coil of each shock absorber unit into an average value within a certain time frame of the force absorbed by the wheel suspension of which the shock absorber unit forms part, and summation means which are designed for summation of the values of the forces absorbed by all wheel suspensions. The conversion means operate on the basis of formulae (1) to (4) described above and the accompanying explanation.

On the basis of the above, also a system can be designed which is operational during the travelling of a vehicle for adjusting the height of the body of a vehicle above the ground over which the vehicle is travelling, which vehicle is provided with shock absorber unit measuring circuits according to the invention, while the system further comprises: second conversion means which are designed for converting a series of measured immittances of the coil of each shock absorber unit into minimum and maximum lengths of the shock absorber unit occurring within a certain time frame; and height adjusting means for adjusting the wheel suspension, on the basis of the output from the second conversion means, for a predetermined height of the body above the ground. Such a system is used in particular in vehicles which have to be able to travel over very hilly ground. The system can be designed for regulating the average value of the shock absorber unit length to a predetermined set value within the time frame, for example adjusted by the vehicle driver, but the system can also be designed in such a way that, depending on the hilliness, which is expressed in the measured minimum and maximum lengths of the shock absorber units of the vehicle, a safe minimum average height of the body above the ground is set while, on the one hand, the body cannot come into contact with the ground and, on the other, the centre of gravity of the vehicle always lies as low as possible for the greatest possible stability of the vehicle. Another application of the above-described system is keeping the height of the body of a vehicle above the ground over which the vehicle is travelling at a constant average value in terms of time, irrespective of the load of the vehicle. With a heavier load of the vehicle, which without special measures would lead to a reduction in the average height of the body above the ground, the height adjusting means of the system can compensate for such a reduction.

Another system can be designed for adjusting the damping characteristic of a shock absorber unit, which system is provided with a shock absorber unit length measuring circuit according to the invention, and further comprises: second conversion means which are designed for converting a series of measured immittances of the coil of each shock absorber unit into minimum and maximum lengths of the shock absorber unit occurring within a certain time frame; and damping adjusting means for adjusting the damping characteristic of the shock absorber unit on the basis of the output from the second conversion means, so that the abovementioned minimum and maximum lengths do not fall short of or exceed predetermined threshold values. With such a system the "stiffness" of the suspension can be adapted to the hilliness of the ground over which the vehicle is travelling, for example by designing the system in such a way that a greater damping by the shock absorber unit occurs in the case of greater hilliness of the ground.

Another system which can be designed is a system for increasing the braking power of a vehicle provided with wheel suspensions with shock absorber unit length measuring circuits according to the invention, which system further comprises: third conversion means which are designed for converting a series of measured immittances of the coil of each shock absorber unit into a value of the acceleration of the length change of the shock absorber unit; and blocking means for fixing the length of the shock absorber units of the front wheels when the abovementioned acceleration in the shock absorber units exceeds a predetermined value. During braking of a vehicle, a tilting of the vehicle about a transverse axis occurs, in the course of which the front side of the vehicle moves in the direction of the ground. The vehicle deceleration which occurs can therefore be derived directly from the accelerations occurring in the wheel suspensions on application of the brakes, which accelerations can be measured with the aid of the shock absorber unit length measuring circuits. If the length of the shock absorber units of the front wheels is now fixed with the aid of the blocking means, with the result that a further compression of the springs of the front wheel suspensions is prevented, the downward directed forces produced by the front side of the vehicle moving towards the ground are directly transmitted to the front wheels. The maximum braking force which can be produced on the front wheels can consequently be achieved much faster than without the application of the abovementioned system. This advantage is achieved both in vehicles with and in vehicles without anti-lock braking system.

Although a number of special applications of the shock absorber unit length measuring circuit according to the invention have been described above, it is pointed out that the basic idea of the invention can be applied to a considerably wider field of technology, namely where there has to be a measurement of a movement of two elements relative to each other. If in such a case a coil is coupled to one of the two elements, and an electrically conducting element which represents a short-circuited winding is coupled to the other element, in which case the electrically conducting element can move in and out of the coil, it will be clear that both the position, the speed of displacement and the acceleration of displacement of the one element relative to the other element can be measured by means of a measuring circuit of the type described above.

BRIEF DESCRIPTION OF THE DRAWINGS

The invention is explained with reference to a drawing, in which.

Identical reference numbers indicate identical components in the figures.

DETAILED DESCRIPTION

Figure 1:
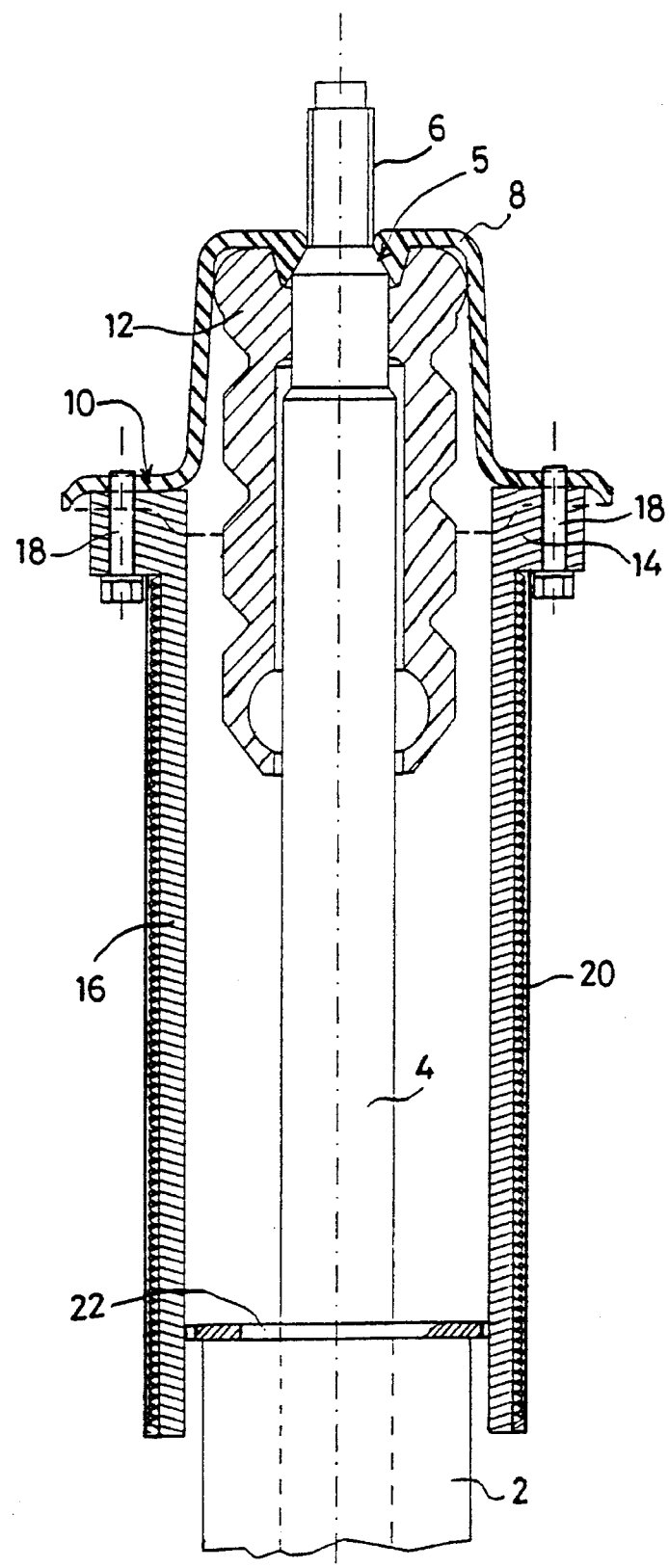
FIG. 1 is a partial longitudinal section of a shock absorber unit with a coil.

FIG. 1 shows a part of a cylinder 2 of a shock absorber unit, inside which cylinder a piston (not shown in any further detail) can move in an axially damped manner. The piston is connected to a piston rod 4, which projects from cylinder 2 and at the end facing away from the cylinder 2 is provided with external screw thread 6, by means of which the piston rod 4 can be fixed in the wheel suspension of a vehicle. At the end of the piston rod 4 facing away from the cylinder 2, provision is made for a shell 8 which is clamped around a conical part 5 of the piston rod 4. The shell 8 has a collar 10 extending essentially at right angles to the axis of the piston rod 4. A shock-absorbing rubber 12 extends along the piston rod 4 partially inside the shell 8, for receiving an end flange 22 of the cylinder 2 when there is an excessive reduction in the length of the shock absorber unit. A flange 14 of a cylinder-shaped coil mandrel 16 is fixed to the collar 10 of the shell 8 by means of a number of bolts 18. Windings of a helical coil 20 are wound on the coil mandrel 16 in a helical groove thereof, with spaces between them. The inside of the coil mandrel 16 is cylindrical and may rest locally against the radial outside of the end flange 22 of the cylinder 2. The end flange 22 provides for a centring guide of the coil mandrel 16 during movement thereof relative to the cylinder 2. However, such a guide of the coil mandrel 16 is not necessary, since deviations of the centring of the coil relative to the cylinder 2 have virtually no effect on the result of the shock absorber length measurement. The windings of the coil 20 are covered at the radial outside by means of a plastic which offers protection against dirt, damp and damage. The combination of the shell 8 and the coil mandrel 16 replaces the usual dust cap at the same place of the shock absorber unit. The material bearing the coil has a very small coefficient of linear expansion, so that dimension changes of the coil as the result of ambient temperature changes have a negligible influence on the electrical properties of the coil.

Figure 2:
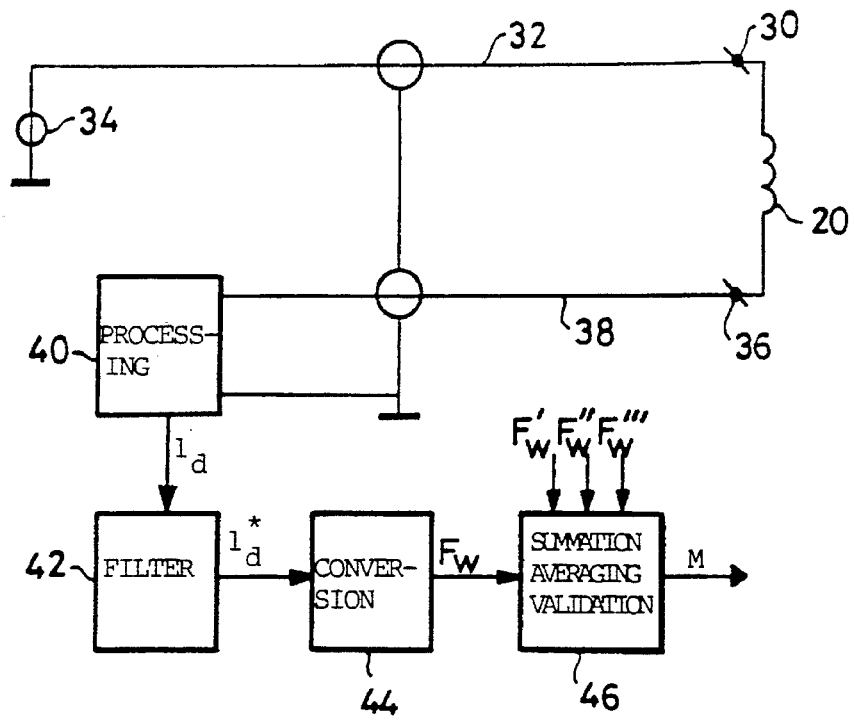
FIG. 2 is a diagram of a measuring circuit according to the invention, incorporated in a vehicle load checking system.

FIG. 2 shows a schematic diagram of a system for measuring the load of a vehicle. A terminal 30 of a coil 20 of the type shown in FIG. 1 disposed around a shock absorber unit is connected by means of a shielded line 32 to a high-frequency voltage source 34. The other terminal 36 of the coil 20 is connected by means of a second shielded line 38 to processing means 40, in which the current running in the line 38—resulting from the voltage generated by the voltage source 34—is measured and converted into a value of the impedance or the admittance of the coil 20. As a result of a virtual earthing thereof, the voltage on line 38 is equal to zero. One terminal of the voltage source 34 and one terminal of the processing means 40, and also the shielding casings of the lines 32 and 38 are connected to a common earth of the measuring circuit. With these measures it is possible to eliminate the influence of the capacities of the lines 32 and 38, which will in general have a length of the order of magnitude of meters. The processing means 40 deliver an output signal with a value which is a measure of the length $l_d$ of the shock absorber unit. The output signal of the processing means 40 is supplied to band-pass filter means 42, which filter interference signals out of the signal, and convert it into a filtered output signal, the value of which is a measure of the length $l_d^*$ (*=after filtering) of the shock absorber unit. The output signal of the filtering means 42 is fed to converter means 44, which on the basis of the earlier mentioned formulae (1) to (4) convert the incoming signal into an output signal, the value of which is a measure of the force $F_w$ absorbed by the wheel suspension of which the shock absorber unit forms part. This output signal, and similar output signals which come from other shock absorber unit length measuring circuits of the same vehicle and are also a measure of the forces $F_w'$, $F_w''$ and $F_w'''$ absorbed by the wheel suspensions of which the other shock absorber units form part, are fed to summation means 46, in which the sum of the forces directed at right angles to the earth surface which are absorbed by all wheel suspensions is determined. After averaging in time and validation, the output signal of the summation means 46 has a value which is a measure of the mass m of the vehicle, and can be used, for example where the vehicle is a lorry, for measuring the load condition of the lorry, and where the vehicle is a taxi can be used for determining whether the taxi is carrying passengers or not.

Figure 3:
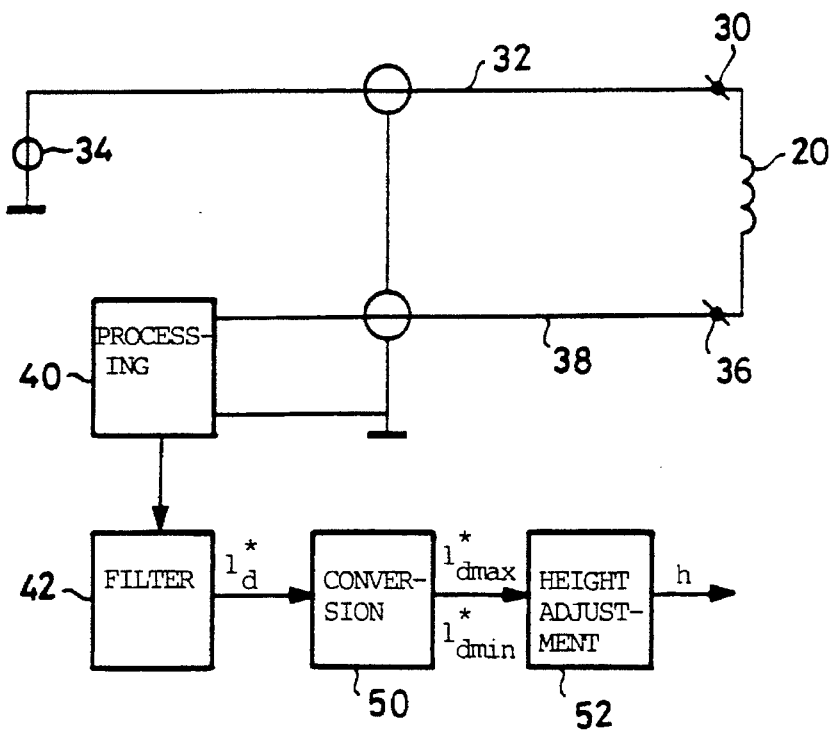
FIG. 3 is a diagram of a measuring circuit according to the invention, incorporated in a system for adjusting the height of the body of a vehicle above the ground.

The diagram shown in FIG. 3 corresponds partially to the diagram shown in FIG. 2, and therefore reference is made to the description of FIG. 2 for an explanation of the parts of the circuit indicated by reference numbers 30–42. The band-pass filter means 42 deliver a filtered output signal, the value of which is a measure of the length $l_d^*$ of the shock absorber unit 20. The output signal of the filter means 42 is fed to second conversion means 50 which determine the minimum $l_d^*{}_{min}$ and maximum $l_d^*{}_{max}$ from a series of measured values $l_d^*$ within a specific time frame. This leads to a corresponding output signal from the second conversion means 50, which output signal is fed to height adjusting means 52, which on the basis of this signal generate an output signal for adjusting the wheel suspension for a predetermined height h of the body above the ground. In general, account will be taken here in an obvious way of the height adjustment of the other wheel suspensions.

Figure 4:
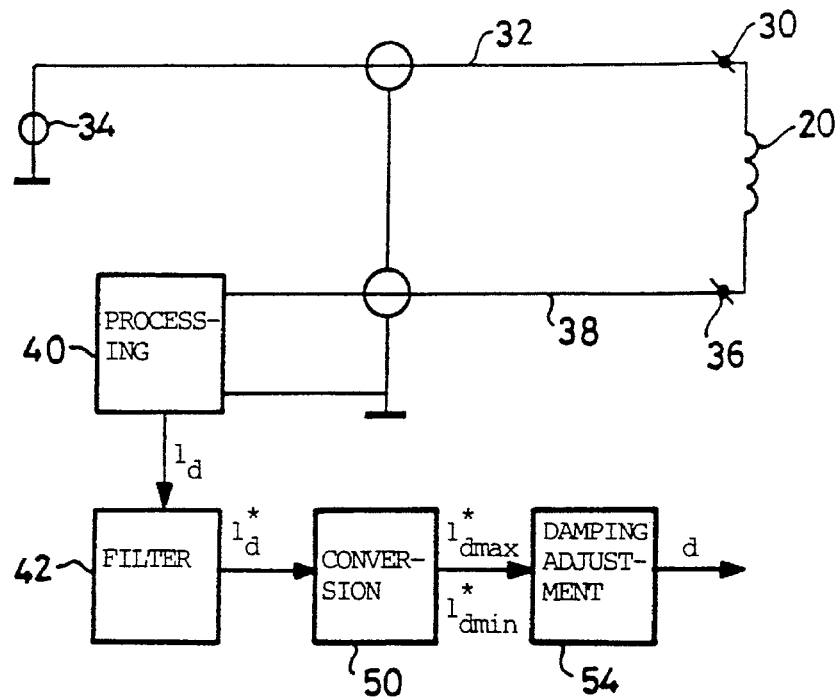
FIG. 4 is a diagram of a measuring circuit according to the invention, incorporated in a system for adjusting the damping characteristic of a shock absorber unit.

A part of the circuit shown in FIG. 4 corresponds to that shown in FIG. 3. In the case of FIG. 4 the output signal from the second conversion means 50 is fed to damping adjusting means 54, which adjust the damping d of the shock absorber unit belonging to the coil 20 on the basis of the value of the output signal from the second conversion means 50. In practice, this amounts to controlling the passage of a valve fitted between various fluid-filled chambers in the shock absorber unit.

Figure 5:
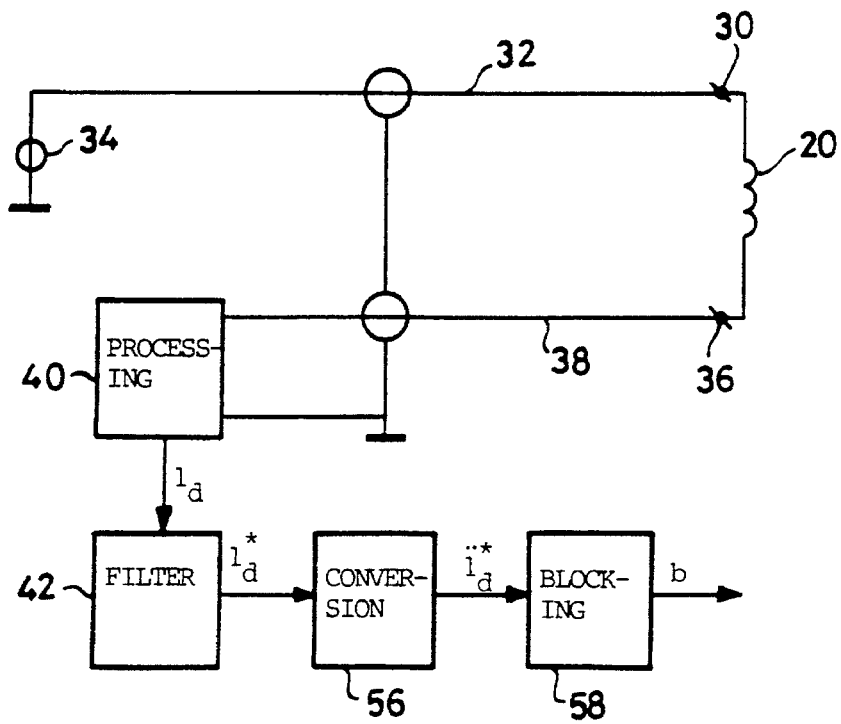
FIG. 5 is a diagram of a measuring circuit according to the invention, incorporated in a system for increasing the braking power of a vehicle.

The diagram shown in FIG. 5 also corresponds partially to the diagram shown in FIG. 2. The band-pass filter means 42 deliver a filtered output signal, the value of which is a measure of the length $l_d^*$ of the shock absorber unit belonging to the coil 20. In the third conversion means 56 a series of output values of the band-pass filter means 42 are converted into a value of the acceleration of the length change $l_d^*$ of the shock absorber unit. The output signal from the third conversion means 56 is supplied to blocking means 58 which can deliver a blocking signal b for fixing the length of the shock absorber units by blocking the parts thereof which are movable relative to each other, when the acceleration determined in the third conversion means 56 exceeds a predetermined value. In this case account will in general be taken of the measured accelerations in the remaining shock absorber units of the vehicle.

I claim:

1. Electric circuit for measuring the length of a shock absorber unit of a vehicle, comprising:

a coil (20) with windings which are fitted around the shock absorber unit, of which a casing (2) of electrically conducting material connected to a part of the wheel suspension of the vehicle is axially movable relative to the coil (20) when there is a change of length of the shock absorber unit as a result of a change in the force absorbed by the wheel suspension;

an oscillator (34) connected to the coil (20), for exciting the coil (20) with an excitation signal of a predetermined frequency; and processing means (40) which are connected to the coil (20) and are designed for determining the value of a relation between the voltage across the coil and the current through the coil, which value is a measure of the length of the shock absorber unit, wherein the oscillator (34) is designed for generating an excitation signal with a frequency which is at least so high that the resistive properties of the coil (20) and of the casing (2) of the shock absorber unit are negligible relative to the inductive properties thereof, the relative magnetic permeability of the electrically conducting material of the casing (2) being approximately equal to one; and the processing means (40) are designed for determining the immittance of the coil (20) from a direct measurement of the voltage across and the current through the coil (20).

2. Shock absorber unit length measuring circuit according to claim 1, wherein the frequency of the excitation signal generated by the oscillator (34) is lower than the resonance frequency of the measuring circuit.

3. Shock absorber unit length measuring circuit according to claim 1 or 2, wherein the windings of the coil (20) are fitted around the shock absorber such that there is a space between adjacent windings.

4. Shock absorber unit length measuring circuit according to claim 3, wherein the processing means (40) are connected to band-pass filter means (42) which are designed for removing from the output signal of the processing means (40) interference signals outside a frequency band around the excitation signal frequency.

5. Shock absorber unit length measuring circuit according to claim 4, wherein the processing means (40) are connected to validation means (46) which are designed for comparing the measured value determined with the aid of the processing means (40) with threshold values, and which validation means (46) suppress or allow through the measured value depending on the comparison result.

6. Shock absorber unit length measuring circuit according to claim 1, wherein the processing means (40) are connected to band-pass filter means (42) which are designed for removing from the output signal of the processing means (40) interference signals outside a frequency band around the excitation signal frequency.

7. Shock absorber unit length measuring circuit according to claim 2, wherein the processing means (40) are connected to band-pass filter means (42) which are designed for removing from the output signal of the processing means (40) interference signals outside a frequency band around the excitation signal frequency.

8. Shock absorber unit length measuring circuit according to claim 1, wherein the processing means (40) are connected to validation means (46) which are designed for comparing the measured value determined with the aid of the processing means (40) with threshold values, and which validation means (46) suppress or allow through the measured value depending on the comparison result.

9. Shock absorber unit length measuring circuit according to claim 2, wherein the processing means (40) are connected to validation means (46) which are designed for comparing the measured value determined with the aid of the processing means (40) with threshold values, and which validation means (46) suppress or allow through the measured value depending on the comparison result.

10. Shock absorber unit length measuring circuit according to claim 3, wherein the processing means (40) are connected to validation means (46) which are designed for comparing the measured value determined with the aid of the processing means (40) with threshold values, and which validation means (46) suppress or allow through the measured value depending on the comparison result.

11. Shock absorber unit length measuring circuit according to claim 6, wherein the processing means (40) are connected to validation means (46) which are designed for comparing the measured value determined with the aid of the processing means (40) with threshold values, and which validation means (46) suppress or allow through the measured value depending on the comparison result.

12. Shock absorber unit length measuring circuit according to claim 7, wherein the processing means (40) are connected to validation means (46) which are designed for comparing the measured value determined with the aid of the processing means (40) with threshold values, and which validation means (46) suppress or allow through the measured value depending on the comparison result.

* * * * *